US012643178B2

(12) United States Patent
Wolf et al.

(10) Patent No.: US 12,643,178 B2
(45) Date of Patent: Jun. 2, 2026

(54) METHOD AND MACHINE FOR CUTTING AND REMOVING WORKPIECE PARTS FROM A PLATE-SHAPED MATERIAL

(71) Applicant: TRUMPF Werkzeugmaschinen SE + Co. KG, Ditzingen (DE)

(72) Inventors: Dennis Wolf, Heimsheim (DE); Florian Raichle, Backnang (DE); Jonathan Wiens, Bad Schwartau (DE); Florian Weick, Davos Dorf (CH); Thomas Müller, Sargans (CH); Mathieu Bohy, Menzingen (CH)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 669 days.

(21) Appl. No.: 18/297,106

(22) Filed: Apr. 7, 2023

(65) Prior Publication Data

US 2023/0241721 A1     Aug. 3, 2023

Related U.S. Application Data

(63) Continuation of application No. PCT/EP2021/075718, filed on Sep. 17, 2021.

(30) Foreign Application Priority Data

Oct. 7, 2020     (DE) ..................... 10 2020 126 231.0

(51) Int. Cl.
  *B23K 26/38*          (2014.01)
  *B23K 26/16*          (2006.01)
(52) U.S. Cl.
  CPC .............. *B23K 26/38* (2013.01); *B23K 26/16* (2013.01)

(58) Field of Classification Search
  CPC ........ B23K 26/38; B23K 26/16; B23K 7/003; B23K 7/10; B23K 9/013; B23K 2101/18;
  (Continued)

(56) References Cited

U.S. PATENT DOCUMENTS

| | | | |
|---|---|---|---|
| 5,164,563 | A | 11/1992 | Aso et al. |
| 8,716,625 | B2 | 5/2014 | Hert |

(Continued)

FOREIGN PATENT DOCUMENTS

| | | |
|---|---|---|
| DE | 69103099 T2 | 11/1994 |
| DE | 102015107922 A1 | 12/2015 |

(Continued)

*Primary Examiner* — Robert G Bachner

(74) *Attorney, Agent, or Firm* — Laurence A. Greenberg; Werner H. Stemer; Ralph E. Locher

(57)     ABSTRACT

A method and machine for cutting and removing a workpiece part from a plate-shaped material includes cutting the workpiece part with a beam or jet directed onto the material and separating the workpiece part and material. The workpiece part is removed as a scrap skeleton removal part. The cut-free workpiece part is lifted out of a workpiece supporting plane by a lifting device and removed by a gripping device, or the cut-free workpiece part is removed downwards from the plane through a gap between workpiece supporting surfaces by an ejection device, or gravity removes the cut-free workpiece part downwards through the gap. Before cutting the workpiece part free, a sacrificial part adjoining the workpiece part and partially having a common cutting line with the workpiece part is cut free from the material before cutting the workpiece part free in the material or scrap skeleton.

9 Claims, 4 Drawing Sheets

(58) Field of Classification Search
      CPC   B23K 26/0876; B23K 37/00; B23K 37/0235;
                                              B23K 37/0408
      See application file for complete search history.

(56)                    References Cited

U.S. PATENT DOCUMENTS

|  |  |  |
|---|---|---|
| 11,583,952 B2 | 2/2023 | Deiss et al. |
| 2015/0034613 A1 | 2/2015 | Hosseini |
| 2015/0352671 A1 | 12/2015 | Darzi |

FOREIGN PATENT DOCUMENTS

|  |  |  |  |
|---|---|---|---|
| EP | 1015150 | B1 | 10/2003 |
| EP | 1563940 | A1 | 8/2005 |
| EP | 2441547 | A1 | 4/2012 |
| JP | H0428393 | A | 1/1992 |
| JP | H0699296 | A | 4/1994 |
| JP | H10146671 | A | 6/1998 |
| JP | H10244394 | A | 9/1998 |
| JP | H10315078 | A | 12/1998 |
| JP | 2004098150 | A | 4/2004 |
| JP | 2015116604 | A | 6/2015 |
| WO | 2015017693 | A1 | 2/2015 |
| WO | 2015080179 | A1 | 6/2015 |
| WO | 2017202767 | A1 | 11/2017 |

METHOD AND MACHINE FOR CUTTING AND REMOVING WORKPIECE PARTS FROM A PLATE-SHAPED MATERIAL

CROSS-REFERENCE TO RELATED APPLICATION

This application is a continuation, under 35 U.S.C. § 120, of copending International Patent Application PCT/EP2021/075718, filed Sep. 17, 2021, which designated the United States; this application also claims the priority, under 35 U.S.C. § 119, of German Patent Application DE 10 2020 126 231.0, filed Oct. 7, 2020; the prior applications are herewith incorporated by reference in their entirety.

FIELD AND BACKGROUND OF THE INVENTION

The invention relates to a method and a machine for cutting and removing workpiece parts from a plate-shaped material, in particular metal sheets.

International Publication WO 2015/17693 A1, corresponding to U.S. Pat. Nos. 10,007,110 and 10,151,923, discloses a method and a machine for cutting and removing workpiece parts from a plate-shaped material, in particular metal sheets. That machine includes a workpiece support for receiving the plate-shaped workpiece. Above the plate-shaped workpiece there can be moved a machining head through the use of which a cutting beam or jet for cutting the workpiece part from the plate-shaped workpiece is directed onto the plate-shaped material. After cutting free the workpiece part as a removal part from the plate-shaped workpiece, the removal part is lifted vertically upwards out of a bearing plane formed by the workpiece support by using a lifting device. The lifting device engages under the removal part with lifting pins. In an opposite direction, the raised or lifted-out removal part is received by a gripping device and transferred into an unloading station, a magazine or a further machining device.

Furthermore, International Publication WO 2017/202767 A1, corresponding to U.S. Pat. No. 11,583,952, discloses a method and a machine for cutting and removing workpiece parts from a plate-shaped material, in particular metal sheets. That machine includes two mutually assigned workpiece supporting surfaces for forming a workpiece support. Between the workpiece supporting surfaces there is formed a cutting gap for a cutting beam or jet which is directed, above the plate-shaped workpiece, via a machining head, onto the plate-shaped material for the machining thereof. In the cutting gap there are provided support slides which are movable along the cutting gap. As a result, the position and/or size of the opening can be set, since the support slides are movable independently of one another within the free space between the mutually assigned workpiece supporting surfaces. As a result, the size of an opening for the entry of the cutting beam or jet can be adjustable. An ejection opening for cut-free workpiece parts as removal parts can also be set by the support slides in order to eject the removal parts downwards with respect to the workpiece support by using an ejection device.

Furthermore, Japanese Publication JP 2015-116 604 A discloses a method for producing workpiece parts with a laser cutting beam. In that production method, a multiplicity of workpieces of simple geometric form are directly lined up and efficiently cut by virtue of a laser beam being moved first of all along a first spatial axis in order to simultaneously produce one end side of a plurality of workpieces by a travelling movement. An opposite end side is then produced by an analogous travelling movement. Subsequently, longitudinal sides of the workpieces and adjoining waste pieces are cut.

The removal of cut-free workpiece parts as removal parts from the plate-shaped material can be made more difficult particularly in the case of relatively large thicknesses of the plate-shaped material and/or in the case of workpiece parts with a complex contour or with an asymmetrical contour, since, after cutting free, such workpiece parts tilt or cant and jam with the scrap skeleton.

SUMMARY OF THE INVENTION

It is accordingly an object of the invention to provide a method and a machine for cutting and removing workpiece parts from a plate-shaped workpiece, in particular metal sheets, which overcomes the hereinafore-mentioned disadvantages of the heretofore-known methods and machines of this general type and in which the removal of cut-free workpiece parts with a complex contour from the plate-shaped material is improved and the process reliability is increased.

With the foregoing and other objects in view there is provided, in accordance with the invention, a method for cutting and removing workpiece parts from a plate-shaped material, in which, before cutting free the workpiece part as a removal part, a sacrificial part adjoining the workpiece part is cut, which sacrificial part partially has a common cutting gap with the workpiece part, and wherein the sacrificial part is cut free from the plate-shaped material before the workpiece part is cut free from the plate-shaped material. This method has the advantage that the sacrificial part creates a sufficient free space in at least one region of the complex contour of the workpiece part in order to remove the latter from the scrap skeleton without tilting or canting. It is thereby possible, for example, to facilitate downward ejection of the removal part with respect to the workpiece support under gravitational force or downward ejection with the aid of an ejection element of an ejection device, as well as lifting the removal part upwards with respect to the scrap skeleton by using a lifting device. These sacrificial parts also make it possible to free regions adjacent to the removal part that are required such that the ejection element of the ejection device or lifting pins of the lifting device can act on the workpiece part. Due to the creation of an additional free space between the removal part and the plate-shaped workpiece or the scrap skeleton, in particular in the region of complex contours of the removal part, canting of the removal parts with respect to the scrap skeleton can also be reduced or eliminated, as a result of which simplified removal and thus an increased process reliability are made possible.

What is to be understood here by "sacrificial part" is a piece of the plate-shaped material that is additionally cut in order to remove the workpiece part. The sacrificial part constitutes waste which, however, does not result during the cutting of a plurality of successive workpieces.

The cut-free sacrificial part is preferably removed from the plate-shaped material before the adjoining workpiece part is cut free. As a result, the workpiece part is connected to the plate-shaped material at least by a web connection or a so-called microjoint until the outer contour of the sacrificial part is completely cut and then the sacrificial part is removed from the plate-shaped material. Alternatively, the cut-free sacrificial part and the cut-free workpiece part can be removed jointly from the plate-shaped material. The sacrificial parts can be ejected and removed from the plate-shaped material by downward ejection—that is say by letting them drop—or by downward ejection by using at least one ejection pin or by upward ejection by using at least one lifting device.

According to a preferred embodiment of the method, there is provision that the at least one sacrificial part is cut adjoining a complex contour of the workpiece part or at least partially surrounding the complex contour of the workpiece part. Here, these sacrificial parts have an optimally simple and rectilinear outer contour which can be removed from the plate-shaped material in a simple manner and can be cut quickly and with little heat input into the material. These sacrificial parts create a free space between the complex contours with respect to the plate-shaped material in order to avoid tilting or canting with respect to the plate-shaped material.

The at least one sacrificial part is preferably cut adjoining the complex contour of the workpiece part that is formed, for example, as undercuts, as a hook-shaped contour or corner region or as an acute or obtuse angle.

According to a further embodiment of the method, the at least one sacrificial part is cut in such a way that, after the sacrificial part is removed, a free space is formed in the plate-shaped material for lifting or ejecting the removal part with a lifting device or an ejection pin. Here, the free space has to be large enough to make it possible for the lifting device or the ejection pin to be able to act on the removal part without coming into contact with the scrap skeleton. Particularly in the case of very narrow or fine contours which are smaller than a diameter of lifting pins or ejection elements in one spatial direction, a free space in the scrap skeleton is created by such a sacrificial part in order to allow ejection or lifting of the removal part.

Furthermore, it is preferred that the sacrificial part adjoining the workpiece part or at least partially surrounding this workpiece part is formed as a rectilinear cross section or a convex envelope with respect to the complex contour. As a result, this complex contour can be surrounded by a simple outer contour which forms one part of the contour of the sacrificial part, wherein a further part of the contour of the sacrificial part corresponds to the complex contour of the workpiece part.

According to a preferred embodiment of the method, a cutting line between the sacrificial part and the plate-shaped material is cut with a larger cutting gap than the common cutting line between the sacrificial part and the workpiece part. This makes it easier to remove the sacrificial part. A wider cutting gap can be achieved, for example, by the use of oxygen instead of nitrogen as cutting gas, by a larger focus diameter of the laser beam, by defocusing the laser beam or by an oscillating movement of the laser beam transversely with respect to the cutting line.

Alternatively, an oblique cut can be cut in the case of a cutting line between the sacrificial part and the plate-shaped material that forms no common edge with the workpiece part, wherein the orientation of the cutting beam or jet with respect to the workpiece surface is such that the upward or downward removal of the sacrificial part from the scrap skeleton is facilitated. It is thus possible, for example, as seen in a sectional view, for the sacrificial part to have a lateral edge with a cutting edge which is oriented perpendicularly to the plane of the plate-shaped material and which faces towards the workpiece part and to have an oblique cutting edge which faces towards the scrap skeleton. If the surface portion lying on the workpiece support is larger than the surface portion facing towards the machining head, it is made easier for the sacrificial part to fall out downwards. If the surface portion lying on the workpiece support is smaller than the surface portion facing towards the machining head, it is made easier for the sacrificial part to be lifted upwards.

With the objects of the invention in view, there is concomitantly provided a machining machine which is configured to carry out the method.

Other features which are considered as characteristic for the invention are set forth in the appended claims.

Although the invention is illustrated and described herein as embodied in a method and a machine for cutting and removing workpiece parts from a plate-shaped material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
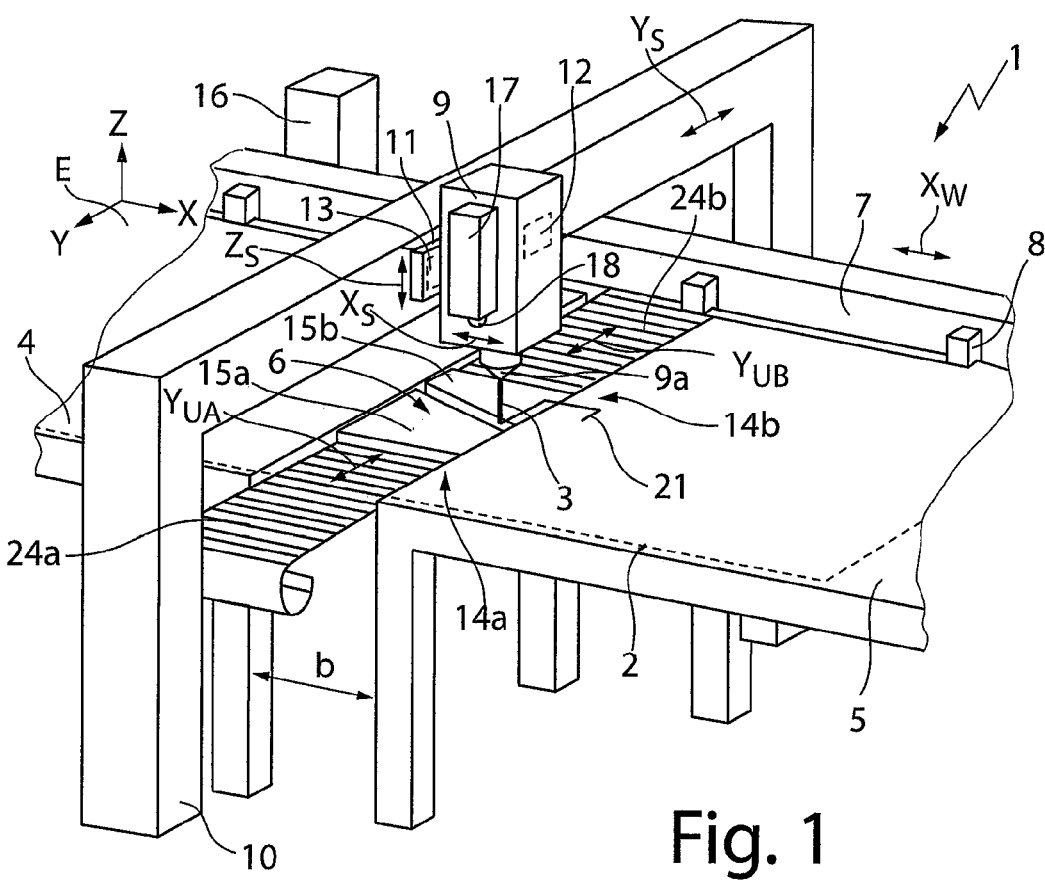
FIG. 1 is a fragmentary, diagrammatic, perspective view of a machining machine for cutting and removing workpiece parts from a plate-shaped material.

Referring now to the figures of the drawings in detail and first, particularly, to FIG. 1 thereof, there is seen, by way of example, a machining machine 1 for cutting and separating a plate-shaped material 2, which is illustrated by a dashed line, by using a cutting beam or jet 3. This is preferably a machining machine for laser cutting, through the use of which a laser beam is directed onto the plate-shaped material 2 to be machined. Alternatively, the cutting beam or jet 3 can also be a plasma jet or a water jet, for example. Alternatively, the machining machine 1 can also be configured for mechanically separating the plate-shaped material 2, for example as a punching machine or punching/laser combination machine.

During machining, the plate-shaped material 2 lies on two workpiece supporting surfaces 4, 5 which form a common workpiece support for the plate-shaped material 2 in a workpiece supporting plane E (xy plane of an xyz coordinate system). The workpiece supporting surfaces 4, 5 can be formed by table surfaces or by pin-shaped support elements (pins), support belts, brushes, rollers, balls, air cushions or the like.

It is possible by using a movement and holding device 7, which has a drive and also clamping devices 8 in the form of clamping jaws for securely holding the plate-shaped material 2, for the plate-shaped material 2 to be displaced in a controlled manner on the workpiece supporting surfaces 4, 5 in a first direction X (referred to below as X direction) and to be positioned at a predetermined workpiece position.

A gap 6 is formed between the two workpiece supporting surfaces 4, 5. The gap 6 extends in a second direction (referred to below as Y direction) over the entire width of the two workpiece supporting surfaces 4, 5. A cutting head 9, which orients and focuses the cutting beam or jet 3 onto the plate-shaped material 2, can be moved in a controlled manner in the Y direction by using a driven slide 11 which serves as a movement device and which is guided on a fixed gantry 10. In the example shown, the cutting head 9 is also movable in the X direction and can be moved in a controlled manner in the X direction with the aid of an additional movement device 12, for example in the form of a linear drive, which is mounted on the slide 11.

The movement devices 11, 12 can be used to position the cutting head 9 both in the X direction and the Y direction at a desired cutting head position $X_S$, $Y_S$ within the gap 6. In the example shown, the cutting head 9 can additionally be moved along a further movement direction Z (referred to below as Z direction) by using a third movement device 13, which is built on the second movement device 11, in order to set the distance between a machining nozzle 9a of the laser cutting head 9 and the surface of the plate-shaped material 2 or in order to position the cutting head 9 at a desired cutting head position $Z_S$ in the Z direction relative to the workpiece supporting plane.

Figure 2:
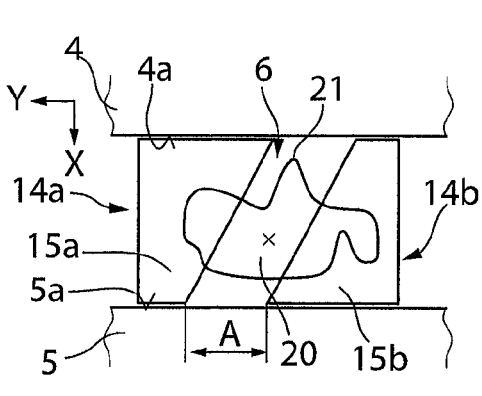
FIG. 2 is a diagrammatic view of support slides which are disposed in a gap between two workpiece supporting surfaces and which have a workpiece part lying thereon.

For additional support of the plate-shaped material 2 and for the additional support of workpiece parts 20 cut during the cutting operation, two support slides 14a, 14b, which are illustrated in a plan view in FIG. 2, are disposed in the gap 6 shown in FIG. 1. The two support slides 14a, 14b each extend over the entire width b of the gap 6 and can be moved in a controlled manner in the gap 6 in the Y direction and independently of one another. The controlled movement of the support slides 14a, 14b between the lateral edges 4a, 5a of the fixed workpiece supporting surfaces 4, 5 can be brought about, for example, with the aid of spindle drives, and the spindle and also the drive motor can be mounted on one of the two fixed workpiece supports 4, 5.

The support slides 14a, 14b can each be moved in the gap 6 to a desired position $Y_{UA}$, $Y_{UB}$ along the second direction Y so that the plate-shaped material 2 and also the workpiece part 20, which is to be cut free from the plate-shaped material 2 or which is cut during machining, can be supported by using a supporting surface 15a, 15b formed on the respective support slide 14a, 14b (FIG. 2). In the case shown, the supporting surfaces 15a, 15b of a respective support slide 14a, 14b terminate flush with the workpiece supporting surfaces 4, 5 in the Z direction, that is to say that the supporting surfaces 15a, 15b of the support slides 14a, 14b are situated in the supporting plane E for the plate-shaped material 2. In the example shown in FIG. 1, the mutually opposed lateral edges of the supporting surfaces 15a, 15b of the support slides 14a, 14b that extend in the X direction each have mounted thereon a covering element 24a, 24b for covering the gap 6 between the two workpiece supporting surfaces 4, 5. They take the form of a roller shutter, for example, and are movable within the gap 6 so as to follow the support slides 14a, 14b.

In order to control the cutting machining operation, the machining machine 1 has a control device 16 which serves for coordinating the movement of the plate-shaped material 2, of the cutting head 9 and of the support slides 14a, 14b in order to set a desired workpiece position $X_W$, a desired cutting head position $X_{SY}$ and, offset, $S_Z$ and also a desired position $Y_{UA}$ and $Y_{UB}$ of the support slides 14a, 14b, in order to allow the cutting of a predetermined cutting contour 21 and to sufficiently support the plate-shaped material 2. In the example shown, the control device 16 also serves for controlling an ejection device 17 which is fastened laterally on the cutting head 9 and which takes the form of an ejection cylinder having a piston rod which serves as an ejection element 18 for downwardly ejecting cut-free workpiece parts 20.

The plate-shaped workpiece 20 can alternatively also be machined in a machining machine 11 having a single workpiece support on which the plate-shaped workpiece 2 rests during machining, while the cutting head 9 moves over the entire workpiece support in the X and Y direction (flying-optics machine). In such a machining machine, the workpiece support usually takes the form of a grid support in which the plate-shaped workpiece 2 lies on the tips of supporting webs. Gaps through which the workpiece parts 20 can fall downwards are formed between the supporting webs.

FIG. 2 illustrates a diagrammatic view of the support slides 14a, 14b and a cutting contour 21 of the workpiece part 20. In order for the workpiece part 20 to be cut free, the cutting head 9 is moved by using the movement devices 11, 12, 13, with the support slides 14a, 14b being moved corresponding to the position of the cutting beam or jet 3 while maintaining a gap width A such that the cutting beam or jet 3 can penetrate downwards through the gap A. The width of the gap A can be changed depending on the cutting contour 21 and/or the size of the workpiece part 20. In any case, the width of the gap A is kept small such that the workpiece part 20 is not independently ejected downwards during machining.

Figure 3:
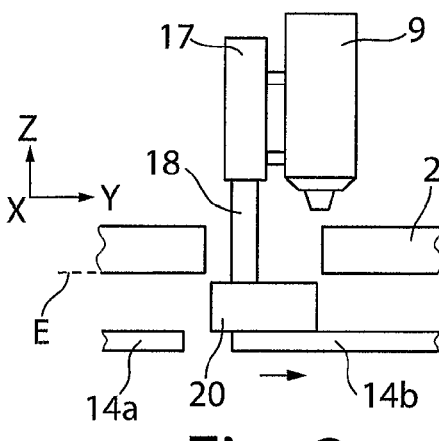
FIG. 3 is a diagrammatic view of a method step during ejection of a cut-free workpiece part as a removal part from the plate-shaped material.

FIG. 3 illustrates a diagrammatic side view of the cutting head 9 during the ejection of the cut-free workpiece part 20 after it has been completely cut free from the plate-shaped workpiece 2. In order to eject the cut-free workpiece part 20, the ejection device 17 is positioned above the cut-free workpiece part 20. The ejection element 18 is then extended and the two support slides 14a, 14b are lowered downwards out of the workpiece supporting plane E, as illustrated. As soon as the support slides 14a, 14b have reached their lower end position, the ejection element 18 can be moved back again into its starting position from the lower position.

For ejection, the separated workpiece part 20 can be moved under the workpiece supporting plane E into the gap 6, for example by virtue of the second support slide 14b being displaced in the Y direction until an ejection position has been reached in which the cut-free workpiece part 20 is ejected downwards.

Alternatively, for ejection of the cut-free workpiece part 20, the width of the gap A between the two support slides 14a, 14b can be increased such that the supporting surfaces 15a, 15b of the support slides 14a, 14b no longer support the cut-free workpiece part. Here, depending on the cutting contour 21 of the workpiece part 20, the support slides 14a, 14b are moved apart in such a way that premature tilting is prevented until the cut-free workpiece part 20 is free from any support by the supporting surfaces 15a, 15b of the support slides 14a, 14b. As a result, the cut-free workpiece part 20 as a removal part can fall downwards and be ejected below the workpiece supporting plane E.

Figures 4, 5:
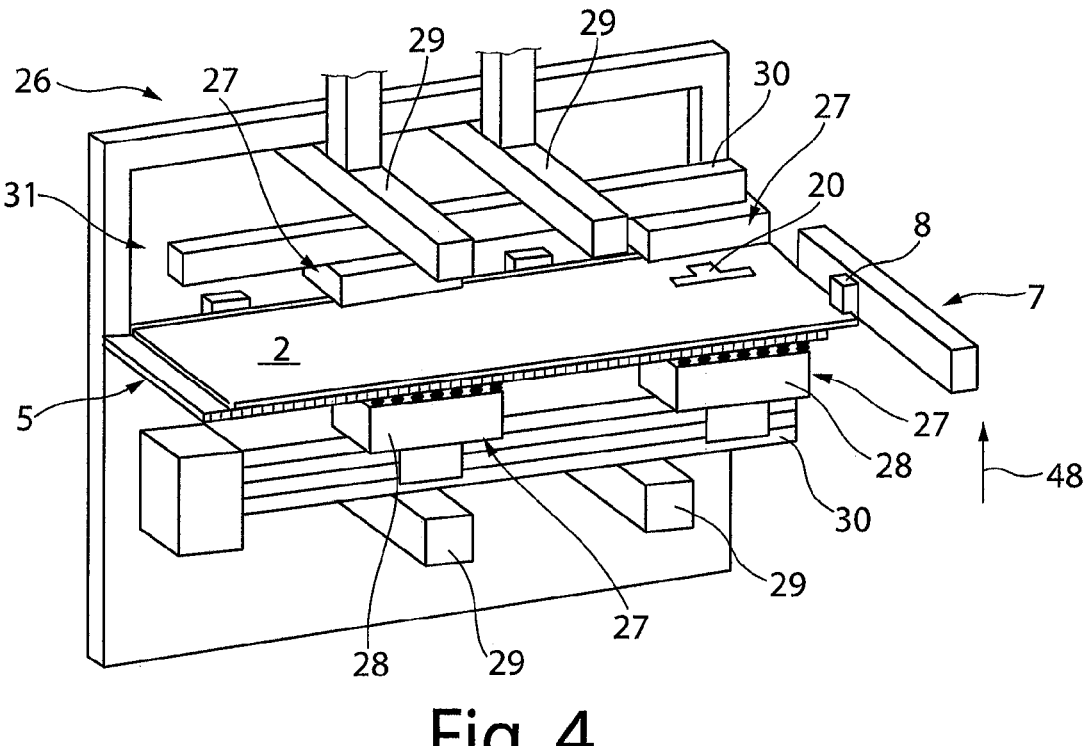
FIG. 4 is a perspective view of a lifting device for a machining machine according to FIG. 1 for removing cut-free workpiece parts from the plate-shaped material.
FIG. 5 is a diagrammatic side view of a method step for lifting the cut-free workpiece part upwards with respect to a workpiece support with the lifting device according to FIG. 4.

FIG. 4 illustrates, as an alternative to the ejection device 17, a lifting device 26 in order to remove the cut-free workpiece part 20 from the plate-shaped material 2 or from a scrap skeleton 22 formed from the plate-shaped material 2 after the workpiece parts 20 have been cut out. This lifting device 26 includes, disposed above the plate-shaped material 2, at least one gripping device 27 and, below the plate-shaped material 2, at least one lifting module 28. The at least one gripping device 27 and the at least one lifting module 28 are received so as to be movable along linear axes 29, 30 at least in the X direction and in the Y direction. In order to remove a cut-free plate-shaped workpiece 20, the plate-shaped material 2 is moved in the Y direction along the workpiece supporting plane E by using the clamping device 8. The gripping device 27 and the lifting module 28 are movable in the Z direction.

FIG. 5 illustrates a diagrammatic view of a lifting pin with the lifting device 26 in which the cut-free workpiece part 20 is lifted with respect to the plate-shaped material 2 by lifting pins 31 of the lifting module 28 with respect to the workpiece supporting plane E. At the same time, the plate-shaped material 2 can be held on the lifting pins 31 by the gripping device 27 during the lifting movement. After the workpiece part 20 has been lifted, the workpiece part 20 can be removed by the gripping device 27. Suction elements 32 of the gripping device 27 are preferably activated such that the cut-free workpiece part 20 is then transferred into an unloading position by a travelling movement of the upper linear axes 29.

Depending on the size and the cutting contour 21 of the workpiece part 20, piston-cylinder units (which are not shown in further detail) are used to control the corresponding lifting pins 31 to lift the workpiece part 20 with respect to the plate-shaped material 2 in the lifting module 28.

Figure 6:
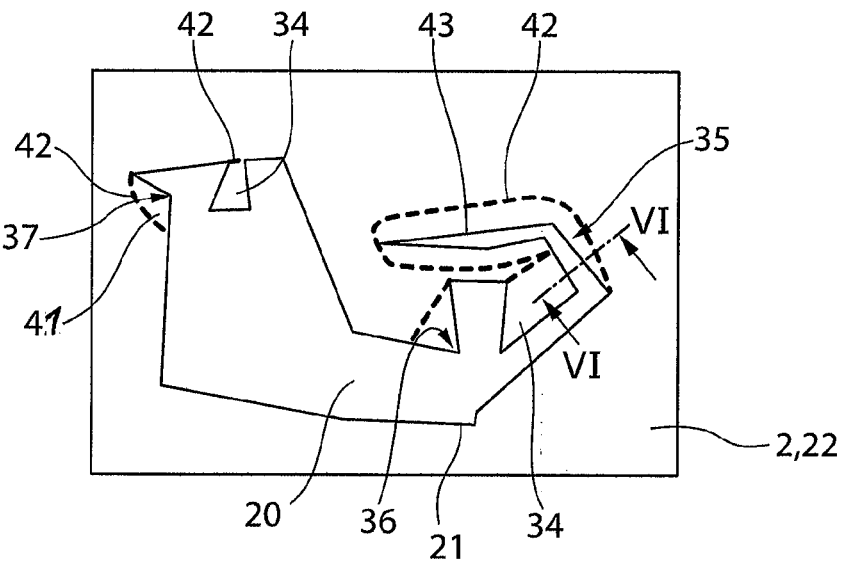
FIG. 6 is a diagrammatic view of a workpiece part with a complex contour and sacrificial parts.

FIG. 6 illustrates a plan view of a plate-shaped material 2 with an exemplary cutting contour 21 of the workpiece part 20 in the surrounding scrap skeleton 22. The thin solid line forms the cutting contour 21 of the workpiece part 20. This cutting contour 21 of the workpiece part 20 has, for example, a plurality of complex contours 33. The complex contour 33 can, for example, be formed as an undercut 34. This undercut 34 can, for example, be in the form of a U-shaped geometry. Furthermore, a hook-shaped region 35 can form the complex contour 33. An undercut 34 can also be formed by the hook-shaped region 35. Moreover, the cutting contour 21 can include a complex contour 33 in the form of an acute angle 36. The cutting contour 21 can, for example, also have an obtuse angle 37. The number and/or configuration of the undercuts 34, of the hook-shaped regions 35, of the acute angles 36 and/or of the obtuse angles 37 can be provided individually and/or in any desired combination with one another. As a result of an individual or any desired combination of these regions 34, 35, 36, 37, the workpiece part 20 has a cutting contour 21 having one or more complex contours 33. Such complex contours 33 of the cutting contour 21 on the workpiece part 20 have a tendency towards canting and towards more difficult removal.

In order to increase the process reliability, such regions 34, 35, 36, 37 are assigned sacrificial parts 41 and are cut. These sacrificial parts 41 are formed between the workpiece part 20 and the scrap skeleton 22. The sacrificial parts have a cutting line 42 which is illustrated by a dashed line and which extends between the sacrificial part 41 and the plate-shaped material 2 or the scrap skeleton 22. Furthermore, the sacrificial part 41 is formed by a cutting line 43 which is illustrated, for example, as a solid line and extends at least partially along the cutting contour 21 of the workpiece part 20 between the two ends of the cutting line 42.

The cutting line 42 partially surrounding the sacrificial part 41 can take the form of a straight line, as is illustrated, for example, in the case of the undercut 34 or in the case of the acute angle 36. This cutting line 42 of the sacrificial part 41 can also form a convex envelope which, for example, surrounds a hook-shaped region 35 or an obtuse angle 37.

The introduction of the sacrificial part 41 or of the sacrificial parts 41 means that, for removal, complex contours 33 are mitigated, that is to say that the workpiece part 20 which has a cutting contour 21 with the at least one complex contour 33 includes a simple outer contour for removal from the plate-shaped material 2 after the sacrificial part 41 has been removed.

During the production of the workpiece part 20 with the cutting contour 21, it is possible, for example, for the region 34—that is to say the undercut—to be introduced and then for the cutting line 42 to be introduced, with the result that the sacrificial part 31 situated in the undercut 34 is separated with respect to the further plate-shaped material 2. For example, the obtuse angle 37 can then be cut, with this being followed by introducing the cutting line 42 for the sacrificial part 41, which cutting line is assigned to the obtuse angle 37. This sequence can continue for the further sacrificial parts 41. Alternatively, it is also possible first of all for only the cutting lines 42 of the sacrificial parts 41 to be introduced in order then to subsequently introduce the cutting line 43 for the cutting contour 21 of the workpiece part 20. The sequence and order can be arbitrary. Short successive movement paths of the cutting head 9 are preferably controlled in order to successively form the cutting lines 42, 41. In any case, it is imperative that the sacrificial part(s) 41 has or have already been cut free before the workpiece part 20 is completely cut free from the plate-shaped material 2.

In the embodiment of the workpiece part 20 that is illustrated in FIG. 6, the introduction of the sacrificial parts 41 allows the workpiece part 20 to be removed from the plate-shaped material according to one of the three embodiments described above.

Figure 7:
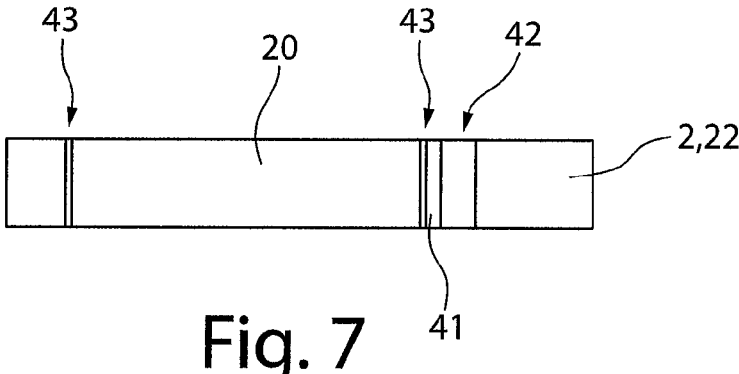
FIG. 7 is a diagrammatic sectional view along the line VI-VI in FIG. 6.

FIG. 7 shows a diagrammatic sectional view along the line VI-VI in FIG. 6. The cutting line 43 for the cutting contour 21 of the workpiece part 20 is preferably controlled with cutting parameters in order to achieve a high edge quality in the cutting gap. Such cutting parameters can be, for example, the use of nitrogen as cutting gas, a smaller focus diameter, a linear movement of the cutting beam or jet or the like. In a region between the sacrificial part 41 and the plate-shaped material 2, the cutting line 42 can be controlled with changed cutting parameters with respect to the cutting line 43, since the edge quality is not relevant. For example, the cutting line 42 can be formed as a wide cut which is cut by an oscillating movement of the laser beam transversely with respect to the cutting gap. This allows easier falling or ejection or lifting of the sacrificial part 41 out of the plate-shaped material 2 or scrap skeleton 22 as a result of the enlarged gap width.

Figure 8:
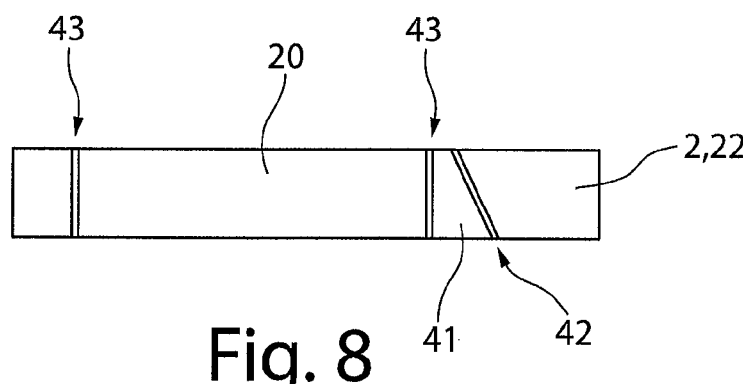
FIG. 8 is a diagrammatic sectional view of an alternative embodiment to FIG. 7.

FIG. 8 illustrates an alternative embodiment for forming the cutting line 42 between the sacrificial part 41 and the plate-shaped material 2 or scrap skeleton 22. In this embodiment, the cutting line 42 can be formed as an oblique cut, thereby making it easier for the sacrificial part 41 to fall out downwards as a result of the cutting geometry. This oblique cut can be arbitrary in the width of the cutting gap.

Figure 9:
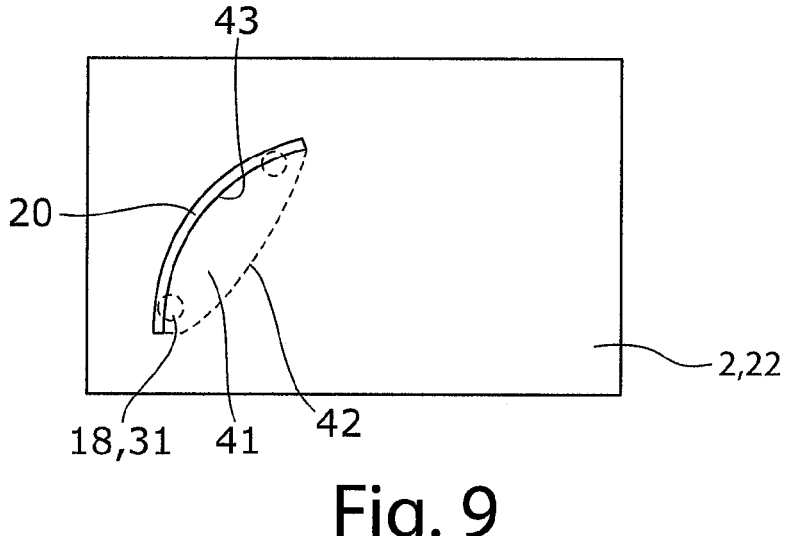
FIG. 9 is a diagrammatic view of the workpiece part with a further complex contour and an embodiment of the sacrificial part.

FIG. 9 illustrates a diagrammatic view of the plate-shaped material 2 with an alternative cutting contour 21 of the workpiece part 20. In this cutting contour 21 of the workpiece part 20, for example the width of the workpiece part 20 is configured to be less than a diameter of an ejection element 18 or lifting pins 31. In order to allow secure ejection or lifting of the workpiece part 20, a sacrificial part 41 is formed in order, after the sacrificial part 41 is removed, to have available in the plate-shaped material 2 or scrap skeleton 22 a sufficient free space for the ejection element(s) 18 or the lifting pin(s) 21.

Figure 10:
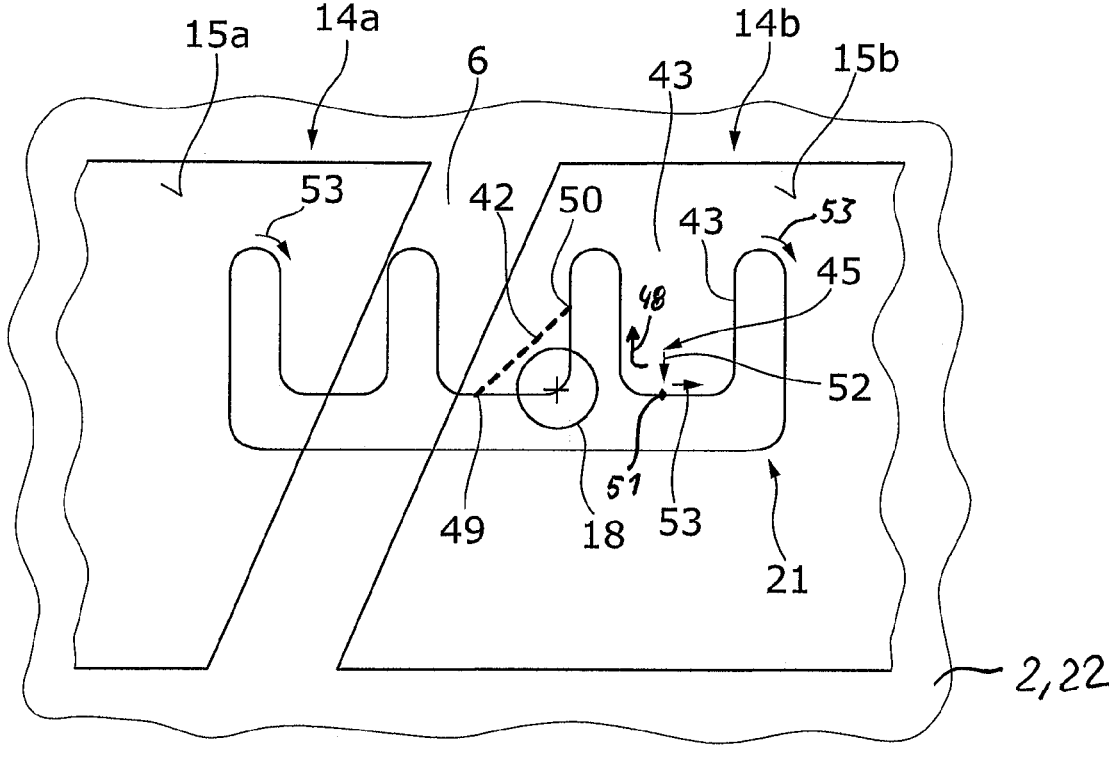
FIG. 10 is a diagrammatic view of the workpiece part with a further complex contour and a further embodiment of the sacrificial part.

FIG. 10 illustrates a further alternative embodiment of a cutting contour 21 of the workpiece part 20. In this embodiment, the workpiece part 20 is ejected downwards through the gap 6 by an ejection element 18 according to the ejection device 17 described in FIG. 1. Alternatively, the workpiece part 20 can also be ejected upwards. The ejection element 18 is diagrammatically illustrated. The diameter of the ejection element 18 is larger than the areal extent of the workpiece part 20 on which the ejection element 18 acts. A part of the plate-shaped material 2 is an obstacle to an ejection device of the ejection element. The sacrificial part 41, which is formed by a cutting line 42 on the one hand and by a part of the cutting line 43 of the cutting contour 21 on the other hand, allows this free space to be achieved.

In order to produce and cut free the workpiece part 20 and the sacrificial part 41, for example the following cutting operation is controlled by the cutting head 9:

The diagrammatically illustrated support slides 14*a*, 14*b* are moved during the cutting process in such a way that the cutting beam or jet 3 can enter the gap 6. In order to produce the workpiece part 2, for example an incision is made at the point 45. The cutting beam or jet 3 is then moved towards the cutting contour 21 up to the point 51 (arrow 52) and the cutting line 43 (arrow 53) is formed until, for example, the position 49 is reached. The cutting line 42 is then introduced up to the position 50. Subsequently, the cutting beam or jet 3 can once again be positioned with respect to the incision 45 and then moved in the direction of arrow 48 along the cutting line 43 until the position 49 is reached. The machining head 9 is preferably shifted from the position 50 to the position 49 and from there the cutting beam or jet 3 is moved further along the cutting line 43 in the clockwise direction until the cutting line 43 has reached the point 51.

It is important in the cutting operation, which can occur in a wide variety of ways, that the sacrificial part 42 has already been cut free before the workpiece part 20 has been completely cut free.

The invention claimed is:

1. A method for cutting and removing at least one workpiece part from a plate-shaped material or a metal sheet, the method comprising:

cutting the at least one workpiece part by using a cutting beam or jet directed onto the plate-shaped material and separating the workpiece part from the plate-shaped material;

removing the at least one workpiece part as a removal part from the plate-shaped material remaining as a scrap skeleton by:

using a lifting device to lift the cut-free workpiece part out of a workpiece supporting plane of the plate-shaped material, or using an ejection device to remove the cut-free workpiece part downwards out of the workpiece supporting plane, or using gravitational force to remove the cut-free workpiece part downwards out of the workpiece supporting plane;

before cutting the workpiece part free for removal from the scrap skeleton, cutting at least one sacrificial part adjoining the workpiece part, the sacrificial part partially having a common cutting line with the workpiece part; and cutting the at least one sacrificial part free from the plate-shaped material before cutting the workpiece part free in the plate-shaped material or scrap skeleton.

2. The method according to claim 1, which further comprises:

removing the cut-free sacrificial part from the plate-shaped material and then cutting the workpiece part free, or simultaneously removing the cut-free sacrificial part and the cut-free workpiece part from the plate-shaped workpiece part.

3. The method according to claim 1, which further comprises cutting the at least one sacrificial part adjoining a complex contour of the workpiece part or at least partially surrounding the complex contour of the workpiece part.

4. The method according to claim 3, which further comprises cutting the at least one sacrificial part adjoining complex contours of the workpiece part formed by an undercut, a hook-shaped region, an acute angle or an obtuse angle.

5. The method according to claim 3, which further comprises providing the sacrificial part assigned to the complex contour of the workpiece part with a cutting line facing towards the plate-shaped workpiece, the cutting line being formed as a straight line or a convex envelope.

6. The method according to claim 1, which further comprises cutting away the at least one sacrificial part to form a sufficiently large free space in the plate-shaped material, after the removal of the sacrificial part, to allow at least one lifting pin or ejection element to act on the workpiece part without contact between the lifting pin or ejection element and the scrap skeleton.

7. The method according to claim 1, which further comprises cutting a cutting line with an enlarged cutting gap between the sacrificial part and the plate-shaped material, the cutting line not representing a common cutting line with the workpiece part.

8. The method according to claim 1, which further comprises cutting a cutting line with an oblique cut between the sacrificial part and the plate-shaped material, the cutting line not representing a common cutting line with the workpiece part.

9. A machining machine for cutting and removing at least one workpiece part from a plate-shaped material or a metal sheet, the machine comprising:

two workpiece supporting surfaces defining a gap therebetween;

at least one support slide movable in said gap, said at least one support slide having at least one covering element at least partially covering said gap;

at least one cutting head configured to direct a cutting beam or jet onto the plate-shaped material for cutting the workpiece part;

a lifting device including a gripping device and at least one lifting module disposed opposite said gripping device, said at least one lifting module having lifting pins configured to move the cut-free workpiece part vertically upwards out of a workpiece supporting plane, or an ejection device having at least one ejection element configured to eject the cut-free workpiece part upwards or downwards relative to the workpiece supporting plane, or said support slides controlling a size of said gap to allow the cut-free workpiece part to fall downwards out of the workpiece supporting plane through said gap under gravitational force; and a control device controlling the machining machine to perform the method according to claim 1.

\* \* \* \* \*